May 23, 1972 W. RIEDEL 3,664,606
DEVICE FOR DEFLECTING THE LEADERS OF CONVOLUTED PHOTOGRAPHIC
FILMS OR THE LIKE
Filed June 26, 1970

INVENTOR
Wolfgang RIEDEL
By his ATTORNEY

United States Patent Office 3,664,606
Patented May 23, 1972

3,664,606
DEVICE FOR DEFLECTING THE LEADERS OF CONVOLUTED PHOTOGRAPHIC FILMS OR THE LIKE
Wolfgang Riedel, Winnenden, Germany, assignor to Robert Bosch Photokino GmbH., Stuttgart-Unterturkheim, Germany
Filed June 26, 1970, Ser. No. 50,097
Claims priority, application Germany, July 1, 1969, P 19 33 288.8
Int. Cl. G03b 1/04; G11b 15/32
U.S. Cl. 242—192                      10 Claims

ABSTRACT OF THE DISCLOSURE

A deflecting device for directing the leader of convoluted photographic film into a channel in a cinematographic apparatus wherein a friction wheel serves to rotate the film supply reel in a direction to unwind the film. The deflecting device has a lever whose pallet supports a detachable springy metallic blade. The lever is pivotable by the carriage for the friction wheel to move the blade against the outermost convolution of film on the rotating supply reel whereby the blade deflects the leader of the outermost convolution away from the nearest convolution and causes it to enter the channel. The blade can be removed and replaced by the user and is held on the lever by friction. The thickness of the blade is less than the thickness of the film.

BACKGROUND OF THE INVENTION

The present invention relates to improvements in devices for deflecting the leaders of convoluted photographic films or like webs of convoluted material. More particularly, the invention relates to improvements in a deflecting device which can be utilized with advantage in cinematographic apparatus to direct the leader of convoluted photographic roll film into a channel or the like for transport along a predetermined path toward a takeup reel.

Presently known deflecting devices for the leaders of convoluted photographic films comprise a lever which is reciprocable or pivotable in the housing of a cinematographic apparatus and has a pallet movable into engagement with the outermost convolution of photographic roll film which is wound on the core of a supply reel. When the supply reel is rotated in a direction to unwind or pay out the film, the pallet of the lever engages the free end or leader of the outermost convolution and directs it into the inlet of a channel wherein the leader advances toward and past a pull-down or another suitable film transporting device. The pallet must enter the space between the leader and the adjacent second outermost convolution of the film and, therefore, its edge portion must be extremely thin. As a rule, the thickness of the edge portion must be considerably less than the thickness (about 0.15 millimeter) of average motion picture film. Such precision finish of the pallet on the deflecting lever necessitates the use of complicated machinery and must be carried out by skilled workmen. As a rule, the lever is mass-produced and its pallet is thereupon subjected to secondary treatment to reduce the thickness of its edge portion to below the thickness of photographic film.

Due to negligible thickness of the edge portion, the deflecting lever is rather sensitive and the edge portion is frequently dented, bent or otherwise damaged by a careless operator. Even a rather minor damage to or deformation of the edge portion necessitates replacement of the entire lever which is a costly proposition and normally involves the delivery or sending of cinematographic apparatus to a repair shop. An amateur is not expected to be capable of replacing a damaged deflecting lever so that the cost of repair is added to the inconvenience of turning in the apparatus and of being unable to use it for the duration of inspection and repair. A damaged deflecting lever is likely to scratch the film surface or is incapable of insuring deflection of the leader in a desired direction.

SUMMARY OF THE INVENTION

An object of the invention is to provide a novel and improved deflecting device for the leaders of convoluted photographic films or other webs of convoluted flexible strip material and to construct the deflecting device in such a way that it can be repaired by the user of the apparatus at a cost which is a small fraction of the cost of repair of a conventional deflecting device.

Another object of the invention is to provide a deflecting device whose parts can be produced and assembled at a cost which is considerably less than the cost of presently known devices.

A further object of the invention is to provide a deflecting device which can be used in many presently known cinematographic or like apparatus wherein the leader of a web of convoluted flexible strip material must be deflected in a predetermined direction.

Still another object of the invention is to provide a deflecting device which can be furnished with one or more inexpensive spare parts to permit repair at the locale of use and by persons having little or no skill.

The invention is embodied in a cinematographic apparatus or the like wherein a photographic film or a like web of flexible strip material is to be conveyed along a predetermined path toward and is to be collected by a takeup reel or the like. The apparatus comprises a supply reel containing a convoluted web wherein the free end or leader of the outermost convolution is normally closely adjacent to the second outermost convolution, a drive which is operative to rotate the reel in a direction to unwind or pay out the web, and a deflecting device including a lever, pawl or a like holder and a preferably springy deflecting element which is separably connected to the holder and is arranged to engage the outermost convolution to thereby deflect the leader in a predetermined direction in response to rotation of the supply reel.

The deflecting element may consist of springy metallic material, such as stainless steel, and is preferably retained on the holder merely by friction so that it can be rapidly replaced with a fresh deflecting element. It is preferred to provide the holder with a pallet or a like male portion which can enter a complementary female portion of the deflecting element to retain the later by friction in an optimum position for engagement of the blade on the deflecting element with the outermost convolution of the web. Such blade can direct the leader into the inlet of a channel wherein the leader advances past a pull-down and a gate toward the takeup reel.

The novel features which are considered as characteristic of the invention are set forth in particular in the appended claims. The improved deflecting device itself, however, both as to its construction and the mode of mounting the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
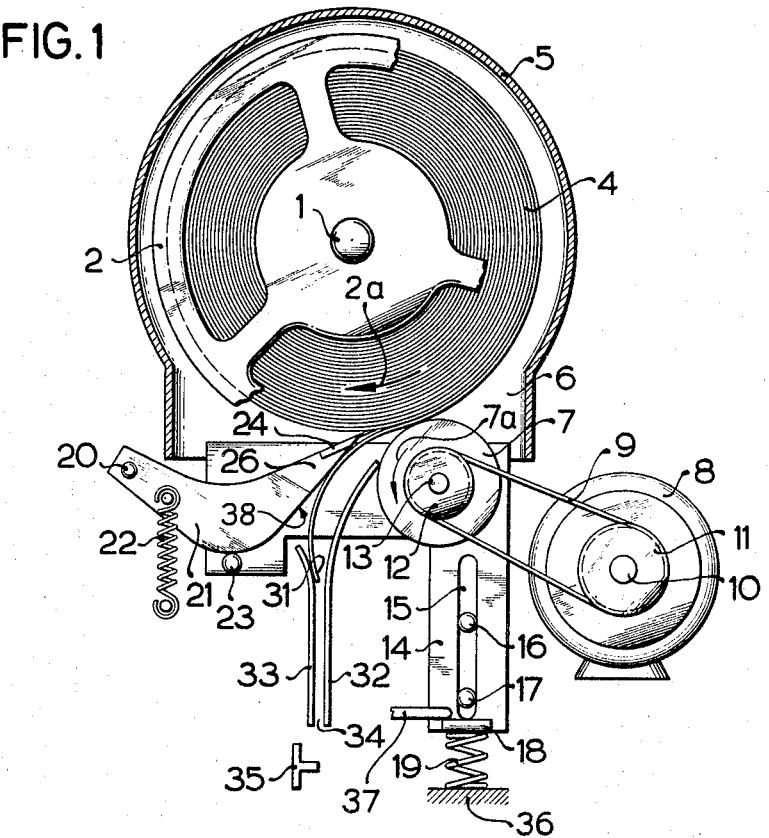
FIG. 1 is a fragmentary schematic partly side elevational and partly sectional view of an apparatus including a deflecting device which embodies the invention, the blade of the deflecting element being shown in operative position.

FIG. 1 illustrates a supply reel 2 which is rotatable on a shaft 1 and whose core supports a supply of convoluted photographic roll film 4. The leader of the film 4, i.e., the foremost portion of the outermost convolution, is shown at 31. The reel 2 is received in a housing 5 which has an open lower end portion 6. This open lower end portion 6 permits entry into the housing 5 of a friction wheel 7 which forms part of a drive serving to rotate the reel 2 in a direction (arrow 2a) to unwind the film 4 from the core, namely, in a clockwise direction, as viewed in FIG. 1. The drive further comprises an electric motor 8 whose output shaft 10 rotates a pulley 11. The pulley 11 drives a pulley 12 on the shaft 13 of the friction wheel 7 by means of an endless belt 9. The friction wheel 7 is rotated in a counterclockwise direction as indicated by the arrow 7a.

The shaft 13 for the friction wheel 7 and pulley 12 is mounted on a carriage 14 which is provided with a slot 15 for fixed guide pins 16, 17 and is biased upwardly by a helical spring 19. The spring 19 reacts against a stationary part 36 of the housing of the apparatus and bears against a platform or ledge 18 of the carriage 14. The longitudinal direction of the slot 15 is normal to and crosses in space with the axis of the shaft 1 so that the friction wheel 7 is movable substantially radially of the convoluted film 4. A manually operated shifting lever 37 or an automatically operated shifting device (not shown) is provided to move the carriage 14 against the opposition of the spring 19 so as to disengage the friction wheel 7 from the outermost convolution of the film 4. The carriage 14 is moved downwardly, as viewed in FIG. 1, when the leader 31 of the film 4 is advanced into the range of the customary pull-down 35 which thereupon transports the film stepwise past the gate, not shown, in a cinematographic apparatus.

The structure of FIG. 1 further comprises a deflecting device which includes a holder 21 here shown as a one-armed lever or pawl which is pivotable on a pin 20 and is biased in a clockwise direction by a helical spring 22 so that it normally abuts against a stop 23 on the carriage 14. The holder 21 serves as a support for a detachable deflecting element 24 which can directly engage the outer side of the outermost convolution of the film 4 to automatically deflect the leader 31 when the reel 2 rotates in a clockwise direction, i.e., when the carriage 14 is held in the operative position of FIG. 1 and the motor 8 rotates the friction wheel 7 in a counterclockwise direction. The deflecting element 24 includes a relatively thin blade 27 (see also FIGS. 2 and 3) whose front edge 25 engages the film 4 and enters between the leader 31 and the next-to-the-outermost convolution of the film 4 when the reel 2 rotates in the direction indicated by the arrow 2a.

The detachability of the deflecting element 24 from the holder 21 constitutes a feature of the improved deflecting device. It enables the user of the cinematographic apparatus or a repairman to replace the deflecting element 24 while leaving the holder 21 connected to the pivot pin 20. It was found that, in order to be effective, the blade 27 of the deflecting element 24 must be very thin, i.e., even thinner than the film 4, and is therefore likely to undergo considerable wear or to be bent, dented or otherwise damaged. The end portion or pallet 26 of the holder 21 is designed in such a way that the deflecting element 24 can be slipped onto such pallet without resorting to special tools and that, when the element 24 is properly attached, the blade 27 has an optimum position to deflect the leader 31 in a desired direction. In the illustrated embodiment, the deflecting element 24 is a piece of leaf spring which resembles a spade and whose blade 27 resembles a rectangular tongue having a width greater than its length. The material of the element 24 is preferably stainless spring steel having a thickness of 0.08 millimeter or less. This is but a fraction of the average thickness (about 0.15 millimeter) of motion picture film. Once the blank consisting of usch material is cut to size and properly shaped, the blade 27 requires no further treatment. This is in contrast to conventional deflecting devices whose tips must be machined with a high degree of precision.

Figure 2:
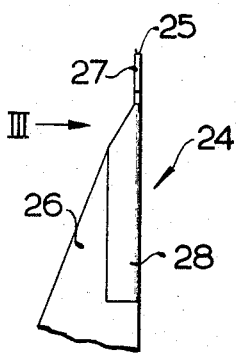
FIG. 2 is an enlarged fragmentary side elevational view of the deflecting device.
Figure 3:
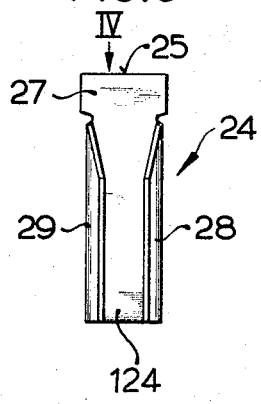
FIG. 3 is a view of the deflecting element as seen in the direction of arrow III in FIG. 2.
Figure 4:
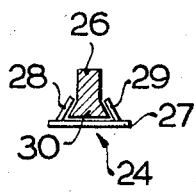
FIG. 4 is a view as seen in the direction of arrow IV in FIG. 3, with the movable holder of the deflecting device shown in section.

As shown in FIGS. 2 to 4, the pallet 26 of the holder 21 is configured in such a way that it can fill the space between the web 124 and the inclined flanges 28, 29 of a female portion of the element 24 to thus insure that the element 24 is attached to the holder 21 in an optimum position for proper engagement between the edge 25 of the blade 27 and the film 4 when the carriage 14 is moved to the operative position of FIG. 1. The flanges 28, 29 can engage with and adhere to the pallet 26 by snap action or by friction in a manner similar to that in which a conventional pen is attached to the front end of a pen holder. The flanges 28, 29 are flexible about the adjacent edges of the web 124 and tend to move nearer to each other than shown in FIG. 4 so as to engage the pallet 26 with a sufficient force which insures proper retention of the deflecting element 24 on the holder 21. FIG. 4 shows that the pallet 26 has a rib or bead 30 whose side faces flare outwardly toward the web 124 and are engaged by the springy flanges 28, 29 when the deflecting element 24 is properly attached to the holder 21. The bead 30 cooperates with the flanges 28, 29 to insure that the deflecting element 24 can only be attached in a single (optimum) position in which the blade 27 can guide the leader 31 of the film 4 in a desired direction, namely, into the channel 34 between two stationary arcuate guides 32, 33 which direct the leader toward the pull-down 35.

The apparatus which employs the structure of FIG. 1 is preferably designed in such a way that the holder 21 is readily accessible to facilitate rapid removal of a damaged deflecting element 24 and attachment of a fresh deflecting element. A damaged deflecting element 24 can be removed and a fresh deflecting element can be attached without resorting to any tools or by resorting to readily available rudimentary tools. The specific design of the male portion 26, 30 of the holder 21 and of the complementary female portion 124, 28, 29 of the deflecting element insures that the latter cannot be attached except in the optimum position.

In order to thread the film 4 into the cinematographic apparatus, the operator starts the motor 8 and causes or permits the carriage 14 to assume the operative position of FIG. 1. The friction wheel 7 is rotated in a counterclockwise direction (arrow 7a) and causes the reel 2 to rotate in a clockwise direction (arrow 2a). The stop 23 of the carriage 14 maintains the holder 21 in an angular position in which the edge 25 of the springy blade 27 bears against the outermost convolution of the film 4 downstream of the point where the film is engaged by the friction wheel (as considered in the direction indicated by arrow 2a). Once the leader 31 reaches the edge 25, it is automatically deflected by the blade 27 and slides along the adjacent cam face 38 of the holder 21 to enter the funnel-shaped inlet of the channel 34 between the guides 32, 33. The spring 19 expands as the diameter of the convoluted film 4 decreases whereby the stop 23 pivots the holder 21 in a counterclockwise direction to maintain the blade 27 in contact with the outermost convolution of the film. The motor 8 can be arrested when the leader 31 reaches the pull-down 35; the claw of the pull-down thereupon periodically enters the adjacent perforations of film 4 and advances the film stepwise toward the takeup reel (not shown).

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus or the like wherein a photographic film or an analogous web of flexible strip material is conveyed along a predetermined path, a combination comprising a supply reel containing a convoluted web wherein the leader of the outermost convolution is normally adjacent to the next outermost convolution; a drive operative to rotate the reel in a direction to unwind the web; and a deflecting device including a holder having an end portion facing the convoluted web and a deflecting element separably connected to said end portion of said holder and arranged to engage the outermost convolution to thereby deflect the leader of the web in a predetermined direction in response to rotation of said reel so that said separately connected deflecting element may be disconnected and replaced by another deflecting element, if required.

2. A combination as defined in claim 1, wherein said deflecting element is in frictional engagement with said end portion of said holder.

3. A combination as defined in claim 1, wherein said end portion is in frictional engagement with a complementary portion of said deflecting element so that the latter is maintained in a predetermined position with reference to said holder.

4. A combination as defined in claim 1, wherein said deflecting element comprises a single web-engaging blade.

5. A combination as defined in claim 4, wherein the thickness of said blade is less than the thickness of said web.

6. A combination as defined in claim 4, wherein at least the blade of said deflecting element consists of springy metallic material.

7. A combination as defined in claim 1, wherein said holder is a lever which is pivotable about a fixed axis to move said deflecting element into and from engagement with the web.

8. A combination as defined in claim 1, wherein said drive comprises a web-engaging friction wheel and said holder is a lever pivotable about a fixed axis to move said deflecting element into engagement with the web at a point located past said friction wheel as considered in the direction of rotation of said reel.

9. A combination as defined in claim 8, wherein said drive further comprises a carriage arranged to move said friction wheel into and away from engagement with said web and having means for pivoting said lever.

10. A combination as defined in claim 1, further comprising guide means defining a channel for entry of said leader subsequent to deflection of the leader by said deflecting element.

References Cited
UNITED STATES PATENTS

| | | | |
|---|---|---|---|
| 3,536,276 | 10/1970 | Bundschuh et al. | 242—192 |
| 3,073,545 | 1/1963 | Frate et al. | 242—128 |
| 3,550,881 | 12/1970 | Roman | 242—192 |
| 3,429,518 | 2/1969 | McKee | 242—186 |

LEONARD D. CHRISTIAN, Primary Examiner

U.S. Cl. X.R.

352—157